(12) United States Patent
Hong et al.

(10) Patent No.: US 10,474,306 B2
(45) Date of Patent: Nov. 12, 2019

(54) SENSOR AND DISPLAY DEVICE INCLUDING THE SAME

(71) Applicant: Samsung Display Co., Ltd., Yongin-si, Gyeonggi-do (KR)

(72) Inventors: Won Ki Hong, Yongin-si (KR); Tae Hee Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 137 days.

(21) Appl. No.: 15/850,549

(22) Filed: Dec. 21, 2017

(65) Prior Publication Data

US 2018/0224978 A1  Aug. 9, 2018

(30) Foreign Application Priority Data

Feb. 3, 2017  (KR) .................. 10-2017-0015635

(51) Int. Cl.
*G06F 3/045* (2006.01)
*G06F 3/041* (2006.01)
*G01D 5/16* (2006.01)

(52) U.S. Cl.
CPC .............. *G06F 3/045* (2013.01); *G01D 5/16* (2013.01); *G06F 3/0416* (2013.01); *G06F 2203/04105* (2013.01)

(58) Field of Classification Search
CPC ........... G06F 3/045; G06F 2203/04105; G06F 3/0416; G01D 5/16
See application file for complete search history.

(56) References Cited

U.S. PATENT DOCUMENTS 9,250,701 B2   2/2016   Kim
2014/0101560 A1*  4/2014   Kwak .................. G06F 1/1652
                                                             715/738

FOREIGN PATENT DOCUMENTS

KR   1020140022180   2/2014

* cited by examiner

*Primary Examiner* — Charles V Hicks
(74) *Attorney, Agent, or Firm* — Innovation Counsel LLP

(57) ABSTRACT

A display device includes a display panel, a variable resistance element positioned on the display panel, a first driving wiring line and a first sensing wiring line connected to the variable resistance element with the variable resistance element disposed between the first driving wiring line and the first sensing wiring line, and a second driving wiring line and a second sensing wiring line connected to the variable resistance element with the variable resistance element disposed between the second driving wiring line and the second sensing wiring line. A first current path between the first driving wiring line and the first sensing wiring line in the variable resistance element is different from a second current path between the second driving wiring line and the second sensing wiring line in the variable resistance element.

20 Claims, 10 Drawing Sheets

SENSOR AND DISPLAY DEVICE INCLUDING THE SAME

CROSS-REFERENCE TO RELATED APPLICATION

This application claims priority to and the benefit of Korean Patent Application No. 10-2017-0015635, filed on Feb. 3, 2017, in the Korean Intellectual Property Office, the entire contents of which are incorporated herein by reference in their entirety.

BACKGROUND

1. Field

An embodiment relates to a sensor and a display device including the same.

2. Description of the Related Art

As interest in information displays and demands on using portable information media increase, research and commercialization on display devices are being actively performed.

Recent display devices include touch sensors for receiving touches of users as well as image displaying functions. Therefore, users may more conveniently use the display devices through the touch sensors.

In addition, recently, various functions are provided to the users by using flexible characteristics of the display devices

SUMMARY

An embodiment relates to a sensor for determining a state of transformation of a display device by using a variable resistance element.

A display device according to an embodiment includes a display panel, a variable resistance element positioned on the display panel, a first driving wiring line and a first sensing wiring line connected to the variable resistance element with the variable resistance element disposed between the first driving wiring line and the first sensing wiring line, and a second driving wiring line and a second sensing wiring line connected to the variable resistance element with the variable resistance element disposed between the second driving wiring line and the second sensing wiring line. A first current path between the first driving wiring line and the first sensing wiring line in the variable resistance element is different from a second current path between the second driving wiring line and the second sensing wiring line in the variable resistance element.

The display device further includes a controller configured to supply a driving signal to the first driving wiring line and the second driving wiring line and to determine whether the display device is in a first transformation state or a second transformation state different from the first transformation state with reference to sensing signals obtained from the first sensing wiring line and the second sensing wiring line.

The first current path corresponds to a first direction and the second current path corresponds to a second direction perpendicular to the first direction.

The controller is configured to obtain a sensing signal to which a first amount of change in resistance of the variable resistance element is reflected from the first sensing wiring line and obtain a sensing signal to which a second amount of change in resistance of the variable resistance element is reflected from the second sensing wiring line.

The display device is bent in the first transformation state and is stretched in the second transformation state.

The controller is configured to not supply the driving signal to the second driving wiring line while supplying the driving signal to the first driving wiring line.

The variable resistance element includes a first sub-variable resistance element and a second sub-variable resistance element. The first driving wiring line and the first sensing wiring line are connected to the first sub-variable resistance element. The second driving wiring line and the second sensing wiring line are connected to the second sub-variable resistance element.

The controller is configured to simultaneously supply the driving signal to the first driving wiring line and the second driving wiring line.

The display device further includes a third driving wiring line and a third sensing wiring line connected to the variable resistance element with the variable resistance element disposed between the third driving wiring line and the third sensing wiring line and a fourth driving wiring line and a fourth sensing wiring line connected to the variable resistance element with the variable resistance element disposed between the fourth driving wiring line and the fourth sensing wiring line.

A third current path between the third driving wiring line and the third sensing wiring line in the variable resistance element is different from a fourth current path between the fourth driving wiring line and the fourth sensing wiring line in the variable resistance element.

The first, second, third, and fourth current paths are different from one another.

The controller is configured to supply the driving signal to the third driving wiring line and the fourth driving wiring line. While the driving signal is applied to one of the first, second, third, and fourth wiring lines, the driving signal is not applied to remaining wiring lines.

The variable resistance element has a shape in which a length is larger than a width.

The variable resistance element has a tapered shape.

The first driving wiring line, the second driving wiring line, the first sensing wiring line, and the second sensing wiring line have mesh structures.

A sensor according to an embodiment includes a variable resistance element, a pair of first wiring lines connected to the variable resistance element with the variable resistance element disposed between the pair of first wiring lines, and a pair of second wiring lines connected to the variable resistance element with the variable resistance element disposed between the pair of second wiring lines. A first current path between the pair of first wiring lines in the variable resistance element is different from a second current path between the pair of second wiring lines in the variable resistance element.

The first current path corresponds to a first direction and the second current path corresponds to a second direction perpendicular to the first direction.

A driving signal is configured to be alternately applied to the first current path and the second current path.

The variable resistance element includes a first sub-variable resistance element and a second sub-variable resistance element. The pair of first wiring lines are connected to the first sub-variable resistance element and the pair of second wiring lines are connected to the second sub-variable resistance element.

A driving signal is configured to be simultaneously applied to the first current path and the second current path.

According to one embodiment, it is possible to provide a sensor for determining a state of transformation of a display device by using a variable resistance element.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
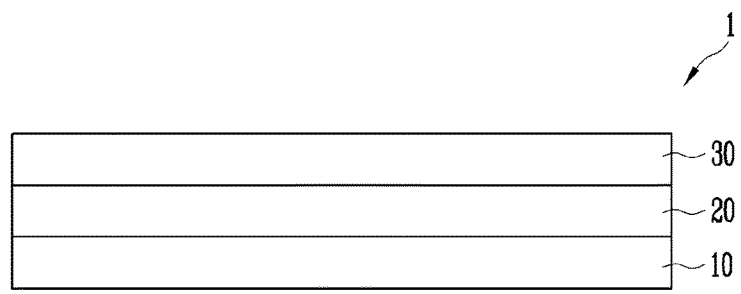
FIG. 1 is a cross-sectional view schematically illustrating a configuration of a display device according to an embodiment.

Specific items of embodiments are included in the detailed description and the accompanying drawings.

Features of the inventive concept, and implementation methods thereof will be clarified through following embodiments described with reference to the accompanying drawings. The inventive concept may, however, be embodied in different forms and should not be construed as limited to the embodiments set forth herein. Throughout this specification and the claims that follow, when it is described that an element is "connected" to another element, the element may be "directly connected" to the other element or "electrically connected" to the other element through a third element. In the accompanying drawings, a portion irrelevant to description of the embodiments will be omitted for clarity. Like reference numerals refer to like elements throughout.

Hereinafter, a sensor according to an embodiment and a display device including the same will be described with reference to the drawings related to the embodiments.

FIG. 1 is a cross-sectional view schematically illustrating a configuration of a display device 1 according to an embodiment.

Referring to FIG. 1, the display device 1 according to the embodiment may include a display panel 10, a sensor 20 for sensing a state of transformation of the display device 1, and a touch sensor 30.

First, the display device 1 according to the embodiment may be flexible. Specifically, the display device 1 may be stretchable or bendable.

Therefore, the display panel 10, the sensor 20, and the touch sensor 30 that form the display device 1 may be stretchable or bendable.

The display panel 10 may display an image. A configuration and operation of the display panel 10 will be specifically described with reference to FIG. 2.

The sensor 20 may sense whether the display device 1 is transformed. Furthermore, the sensor 20 may determine whether the display device 1 is bent or stretched. In addition, the sensor 20 may sense a degree to which the display device 1 is transformed.

The configuration and operation of the sensor 20 will be described in detail with reference to FIGS. 3 through 10.

The touch sensor 30 may sense a touch of a user that is input to the display device 1, specifically, a position and intensity of the touch. The touch sensor 30 may be driven by one of various methods such as a capacitance change sensing method, a resistance change sensing method, and a light amount change sensing method.

On the other hand, in FIG. 1, it is illustrated that the sensor 20 is positioned on the display panel 10 and the touch sensor 30 is positioned on the sensor 20. However, the embodiments are not limited thereto. That is, positions of the display panel 10, the sensor 20, and the touch sensor 30 may vary.

In addition, in FIG. 1, it is illustrated that the display panel 10, the sensor 20 for sensing the state of transformation of the display device 1, and the touch sensor 30 are separate from each other. However, the embodiments are not limited thereto. That is, the display panel 10, the sensor 20, and the touch sensor 30 may be integrated with each other.

Figure 2:
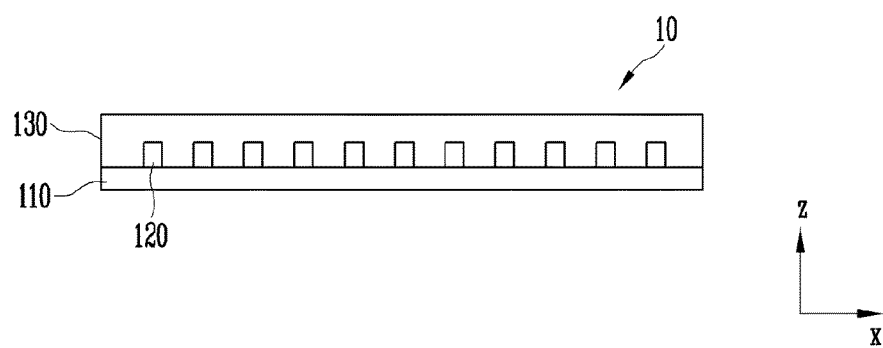
FIG. 2 is a view illustrating a configuration of a display panel of FIG. 1.

FIG. 2 is a view illustrating a configuration of the display panel 10 of FIG. 1.

Referring to FIG. 2, the display panel 10 according to the embodiment may include a substrate 110, pixels 120, and an encapsulation layer 130.

The plurality of pixels 120 may be positioned on the substrate 110. In addition, the encapsulation layer 130 may be positioned on the pixels 120 and the substrate 110.

For example, the substrate 110 may be formed of an insulating material such as glass or resin. In addition, the substrate 110 may include a flexible material so as to be curved or folded and may have a single layer structure or a multilayer structure.

For example, the substrate 110 may include at least one among polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

The material that forms the substrate 110 may vary and may include fiber glass reinforced plastic (FRP).

The pixels 120 may emit light components by control of a display driver (not shown) and may be protected by the encapsulation layer 130.

For example, the encapsulation layer 130 may prevent moisture and oxygen from permeating into the pixels 120. In addition, the encapsulation layer 130 may function as a substrate of the sensor 20 or the touch sensor 30.

At this time, the encapsulation layer 130 may include at least one among glass, an organic material, and an inorganic material and may have a single layer structure or a multilayer structure.

For example, the encapsulation layer 130 may have a multilayer structure including at least one organic layer and at least one inorganic layer.

The organic layer may be formed of an organic insulating material such as polyacryl, polyimide, a fluorine based carbon compound such as polytetrafluoroethylene, e.g., Teflon, polyepoxy, or benzocyclobutene and the inorganic layer may be formed of an inorganic insulating material such as polysiloxane, a silicon nitride, a silicon oxide, or a metal oxide including an aluminum oxide.

Figure 3:
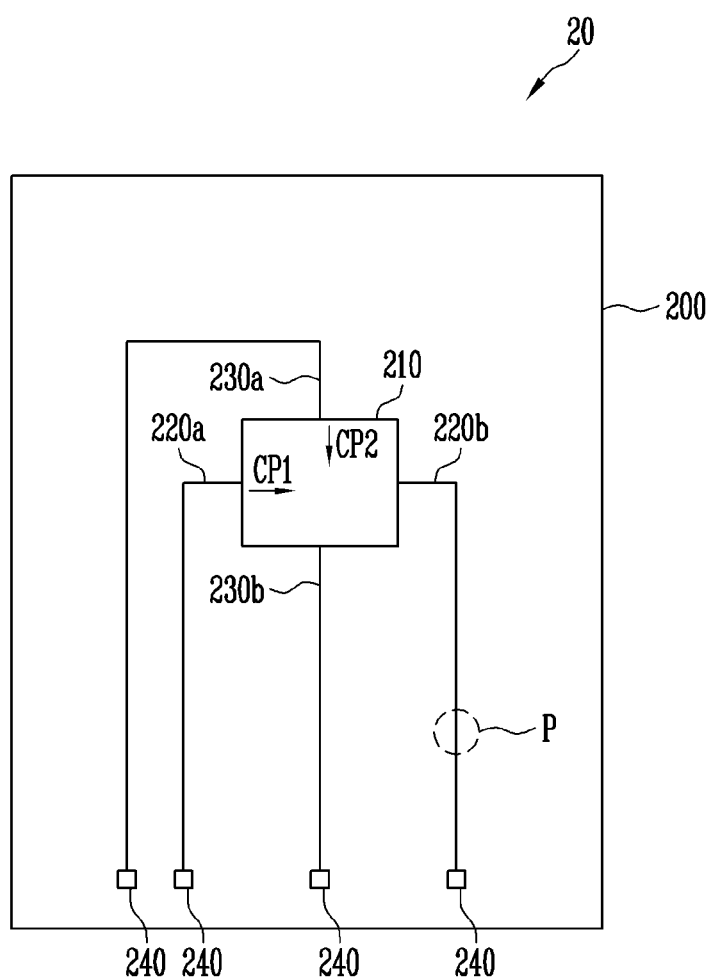
FIG. 3 is a view illustrating a configuration of a sensor according to an embodiment.
Figure 3:
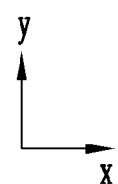

FIG. 3 is a view illustrating a configuration of a sensor 20 according to an embodiment.

Referring to FIG. 3, the sensor 20 according to the embodiment may include a substrate 200 and a variable resistance element 210 arranged on the substrate 200.

The substrate 200 may be formed of the same material as the material that may form the substrate 110 of FIG. 2.

The variable resistance element 210 may be an element of which an electric characteristic changes in accordance with a degree of transformation. Resistance of the variable resistance element 210 may change in accordance with pressure or force applied from the outside.

The variable resistance element 210 may include a material of which resistance changes in accordance with pressure. For example, the variable resistance element 210 may include a material referred to as a force sensitive material or a force sensitive resistor.

According to one embodiment, the variable resistance element 210 may include nanoparticles. For example, the nanoparticles may be a nanotube, a nano-column, a nano-rod, nano-pore, or nanowire. The nanoparticles may include particles of carbon, graphite, metamorphosis metalloid, metal, a conductive oxide of the metamorphosis metalloid or the metal, or a conductive nitride of metamorphosis metalloid or the metal or may include core shell structured particles in which the particles are coated on an insulating bead or a combination of the above particles. The metamorphosis metalloid may include one of antimony (Sb), germanium (Ge), and arsenic (As) or an alloy of the above metals. The metal may include zinc (Zn), aluminum (Al), scandium (Sc), chrome (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy of the above metals. The conductive oxide may include indium tin oxide (ITO), indium zinc oxide (IZO), aluminum doped zinc oxide (AZO), gallium indium zinc oxide (GIZO), zinc oxide (ZnO), or a mixture of the above oxides.

According to the embodiment, the nanoparticles may be at least one of a carbon nanotube and a silver nanowire. However, the embodiments are not limited thereto.

In addition, the variable resistance element 210 may be formed of a piezo-resistive semiconductor, for example, low temperature polysilicon (LTPS).

In addition, the variable resistance element 210 may be a strain gauge.

Referring to FIG. 3, a first driving wiring line 220*a* and a first sensing wiring line 220*b* may be connected to the variable resistance element 210. At this time, the variable resistance element 210 may be positioned between the first driving wiring line 220*a* and the first sensing wiring line 220*b*.

One end of the first driving wiring line 220*a* is connected to a pad 240 and the other end of the first driving wiring line 220*a* may be connected to the variable resistance element 210. In addition, one end of the first sensing wiring line 220*b* is connected to the variable resistance element 210 and the other end of the first sensing wiring line 220*b* may be connected to a pad 240.

When a driving signal is applied to the first driving wiring line 220*a*, a first current path CP1 may be formed along the other end of the first driving wiring line 220*a* and one end of each of the variable resistance element 210 and the first sensing wiring line 220*b*.

At this time, the first current path CP1 may correspond to a first direction (an x axis direction).

A second driving wiring line 230*a* and a second sensing wiring line 230*b* may be connected to the variable resistance element 210. At this time, the variable resistance element 210 may be positioned between the second driving wiring line 230*a* and the second sensing wiring line 230*b*.

One end of the second driving wiring line 230*a* is connected to a pad 240 and the other end of the second driving wiring line 230*a* may be connected to the variable resistance element 210. In addition, one end of the second sensing wiring line 230*b* is connected to the variable resistance element 210 and the other end of the second sensing wiring line 230*b* may be connected to a pad 240.

When the driving signal is applied to the second driving wiring line 230*a*, a second current path CP2 may be formed along the other end of the second driving wiring line 230*a* and one end of each of the variable resistance element 210 and the second sensing wiring line 230*b*.

At this time, the second current path CP2 may correspond to a second direction (a y axis direction).

On the other hand, when the display device 1 is transformed, the wiring lines 220*a*, 220*b*, 230*a*, and 230*b* as well as the variable resistance element 210 may be also transformed. The wiring lines 220*a*, 220*b*, 230*a*, and 230*b* may be formed of a material having a small transformation rate with respect to pressure or force applied from the outside so that amounts of changes in resistances of the wiring lines 220*a*, 220*b*, 230*a*, and 230*b* are not reflect to sensing signals.

Although not shown in FIG. 3, the sensor 20 for sensing the state of transformation of the display device 1 may further include a controller and the pads 240 may be electrically connected to the controller.

The controller may apply the driving signal to the first driving wiring line 220*a* and the second driving wiring line 230*a*. In addition, the controller may obtain the sensing signals from the first sensing wiring line 220*b* and the second sensing wiring line 230*b*.

The controller may determine whether the display device 1 is transformed by using the sensing signals.

Specifically, when the display device 1 is transformed, the variable resistance element 210 may be contracted or extended. Therefore, resistance of the variable resistance element 210 may change.

That is, the controller may determine that the display device 1 is transformed when a sensing signal to which an amount of change in resistance of the variable resistance element 210 is reflected is obtained.

The flexible display device 1 according to the present embodiment may be bent or stretched.

The variable resistance element 210 is extended in the first direction (the x axis direction) both when the display device 1 is bent and stretched.

When only the first driving wiring line 220a and the first sensing wiring line 220b are connected to the variable resistance element 210, the resistance of the variable resistance element 210 may increase both when the display device 1 is bent and stretched.

In such a case, the controller may sense that the display device 1 is transformed. However, it is difficult to determine whether the display device 1 is bent or stretched.

However, since the sensor 20 according to the embodiment includes the two pairs of wiring lines 220a, 220b, 230a, and 230b connected to the variable resistance element 210, it may be determined in which state the display device 1 is transformed as well as whether the display device 1 is transformed.

Operation of the sensor 20 according to the embodiment will be described in detail hereinafter.

On the other hand, according to the current specification, a case in which the display device 1 is curved (for example, bent) at a predetermined angle or with a predetermined curvature is referred to as a first transformation state and a case in which the display device 1 is extended or contracted (for example, stretched) on almost the same plane is referred to as a second transformation state.

Figure 4:
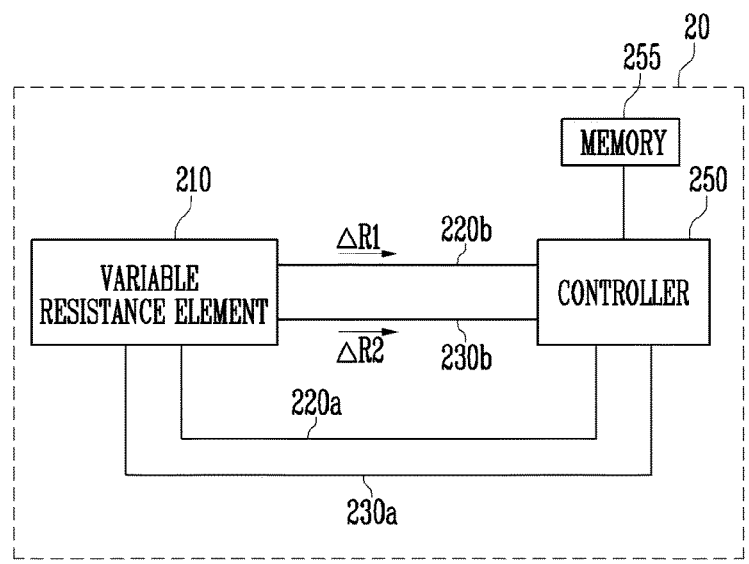
FIG. 4 is a block diagram illustrating a configuration of a sensor including a controller according to an embodiment.

FIG. 4 is a block diagram illustrating a configuration of a sensor including a controller 250 according to an embodiment. In FIG. 4, for convenience sake, the pad 240 is not shown.

Referring to FIG. 4, the sensor 20 may further include the controller 250.

The controller 250 may apply the driving signal to the driving wiring lines 220a and 230a and may obtain the sensing signals from the sensing wiring lines 220b and 230b.

At this time, the controller 250 may not simultaneously apply the driving signal to the first driving wiring line 220a and the second driving wiring line 230.

For example, the controller 250 may not apply the driving signal to the second driving wiring line 230a while applying the driving signal to the first driving wiring line 220a.

At this time, a first amount of change in resistance ΔR1 of the variable resistance element 210 may be reflected to the sensing signal obtained from the first sensing wiring line 220b and the first amount of change in resistance ΔR1 may correspond to the first current path CP1.

Next, the controller 250 may not apply the driving signal to the first driving wiring line 220a while applying the driving signal to the second driving wiring line 230a.

At this time, a second amount of change in resistance ΔR2 of the variable resistance element 210 may be reflected to the sensing signal obtained from the second sensing wiring line 230b and the second amount of change in resistance ΔR2 may correspond to the second current path CP2.

That is, the controller 250 may sequentially obtain the change in resistance of the variable resistance element 210 corresponding to the first direction (the x axis direction) and the change in resistance of the variable resistance element 210 corresponding to the second direction (the y axis direction).

The controller 250 may determine whether the display device 1 is in the first transformation state or the second transformation state by using the first amount of change in resistance ΔR1 and the second amount of change in resistance ΔR2.

For this purpose, the sensor 20 may further include a memory 255. Values of the first amount of change in resistance ΔR1 and the second amount of change in resistance ΔR2 corresponding to a degree to which the display device 1 is transformed (hereinafter, referred to as the transformation rate of the display device 1) may be stored in the memory 255.

For example, information on the first amount of change in resistance ΔR1 and the second amount of change in resistance ΔR2 that are measured when the display device 1 is transformed to be in the first transformation state so as to have predetermined transformation rates may be stored in the memory 255. That is, the information on the first amount of change in resistance ΔR1 and the second amount of change in resistance ΔR2 that are matched with the respective transformation rates (when the display device 1 is transformed to be in the first transformation state) may be stored in the memory 255.

In addition, information on the first amount of change in resistance ΔR1 and the second amount of change in resistance ΔR2 that are measured when the display device 1 is transformed to be in the second transformation state so as to have predetermined transformation rates may be stored in the memory 255. That is, the information on the first amount of change in resistance ΔR1 and the second amount of change in resistance ΔR2 that are matched with the respective transformation rates (when the display device 1 is transformed to be in the second transformation state) may be stored in the memory 255.

The controller 250 may determine whether the display device 1 is in the first transformation state or the second transformation state with reference to the first amount of change in resistance ΔR1 and the second amount of change in resistance ΔR2 obtained from the sensing signals and the information stored in the memory 255.

Figure 5:
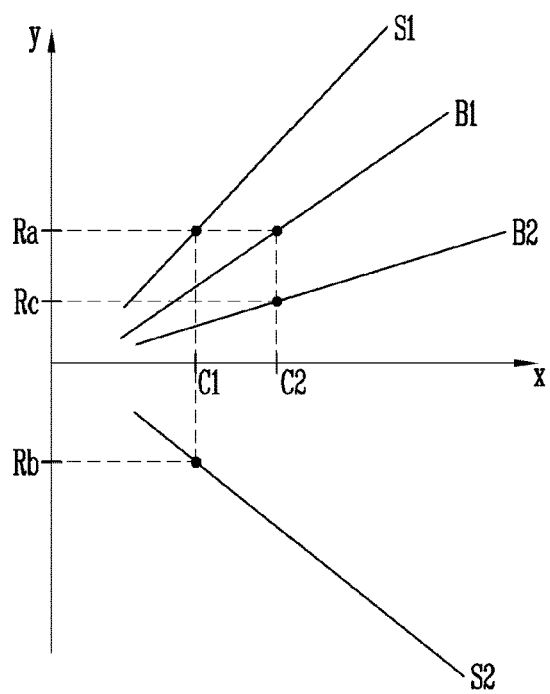
FIGS. 5 and 6 are views exemplarily illustrating an operation of the controller of FIG. 4.
Figure 6:
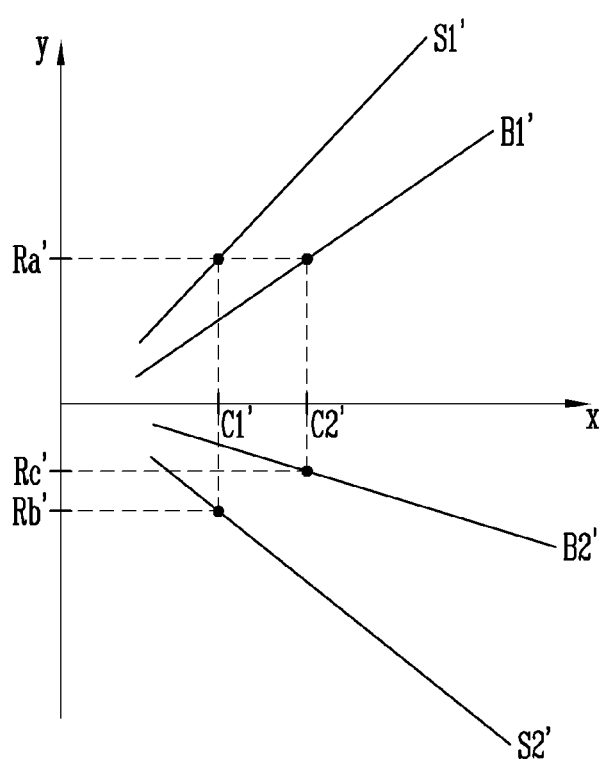

FIGS. 5 and 6 are views exemplarily illustrating an operation of the controller of FIG. 4.

In particular, in FIGS. 5 and 6, first graphs B1 and B1' each representing a relationship between the transformation rate of the display device 1 in the first transformation state and the first amount of change in resistance ΔR1, second graphs B2 and B2' each representing a relationship between the transformation rate of the display device 1 in the first transformation state and the second amount of change in resistance ΔR2, third graphs S1 and S1' each representing a relationship between the transformation rate of the display device 1 in the second transformation state and the first amount of change in resistance ΔR1, and fourth graphs S2 and S2' each representing a relationship between the transformation rate of the display device 1 in the second transformation state and the second amount of change in resistance ΔR2.

X axes of FIGS. 5 and 6 correspond to the transformation rates of the display device 1 and Y axes of FIGS. 5 and 6 correspond to the amounts of changes in resistances.

Referring to FIG. 5, when the value of the first amount of change in resistance ΔR1 calculated by the controller 250 is Ra and the value of the second amount of change in resistance ΔR2 calculated by the controller 250 is Rb, it may be determined that the display device 1 is in the second transformation state.

In addition, the controller 250 may determine that the display device 1 is transformed so as to have a transformation rate by C1.

Unlike in the above, when the value of the first amount of change in resistance ΔR1 calculated by the controller 250 is Ra and the value of the second amount of change in resistance ΔR2 calculated by the controller 250 is Rc, it may be determined that the display device 1 is in the first transformation state.

In addition, the controller 250 may determine that the display device 1 is transformed so as to have a transformation rate by C2. Each of C1 and C2 may be any number that exemplarily indicates the transformation rates of the display device 1.

When the second driving wiring line 230a and the second sensing wiring line 230b are not provided in the variable resistance element 210, the controller 250 may obtain only the information on the first amount of change in resistance ΔR1. Without the information on the second amount of change in resistance ΔR2, it is difficult to determine whether Ra that is the value of the first amount of change in resistance ΔR1 is included in the first graph B1 or the third graph S1.

That is, it may not be determined whether the display device 1 is in the first transformation state or the second transformation state. According to the embodiment, both the first amount of change in resistance ΔR1 and the second amount of change in resistance ΔR2 may be obtained by connecting the two pairs of wiring lines 220a, 220b, 230a, and 230b to the variable resistance element 210. Therefore, the transformation state of the display device 1 may be determined.

On the other hand, as illustrated in FIG. 5, the resistance of the variable resistance element 210 in the first direction increases (the first amount of change in resistance ΔR1 has a positive number) and the resistance of the variable resistance element 210 in the second direction is reduced (the second amount of change in resistance ΔR2 has a negative number) when the display device 1 is in the second transformation state. Further, both the resistance of the variable resistance element 210 in the first direction and the resistance of the variable resistance element 210 in the first direction increase when the display device 1 is in the second transformation state. Thus, the transformation state of the display device 1 may be determined only by determining whether the first amount of change in resistance ΔR1 and the second amount of change in resistance ΔR2 are positive numbers or negative numbers.

That is, the controller 250 may determine that the display device 1 is in the second transformation state when the first amount of change in resistance ΔR1 and the second amount of change in resistance ΔR2 have different signs.

In FIG. 6, unlike in FIG. 5, it is difficult to determine the transformation state of the display device 1 only by determining whether the first amount of change in resistance ΔR1 and the second amount of change in resistance ΔR2 are positive numbers or negative numbers.

Referring to FIG. 6, when the value of the first amount of change in resistance ΔR1 calculated by the controller 250 is Ra' and the value of the second amount of change in resistance ΔR2 calculated by the controller 250 is Rb', it may be determined that the display device 1 is in the second transformation state.

In addition, the controller 250 may determine that the display device 1 is transformed so as to have a transformation rate by C1'.

Unlike in the above, when the value of the first amount of change in resistance ΔR1 calculated by the controller 250 is Ra' and the value of the second amount of change in resistance ΔR2 calculated by the controller 250 is Rc', it may be determined that the display device 1 is in the first transformation state.

In addition, the controller 250 may determine that the display device 1 is transformed so as to have a transformation rate by C2'. Each of C1' and C2' may be any number that exemplarily indicates the transformation rates of the display device 1.

According to the present embodiment, a user interface (UI) displayed on the display panel 10 may vary in accordance with the transformation state of the display device 1.

FIGS. 7A through 7D are views illustrating an arrangement structure and a shape of a variable resistance element. In FIGS. 7A through 7D, for convenience sake, the pads 240 for connecting the variable resistance element 210 and the wiring lines 220a, 220b, 230a, and 230b are not shown.

Figure 7A:
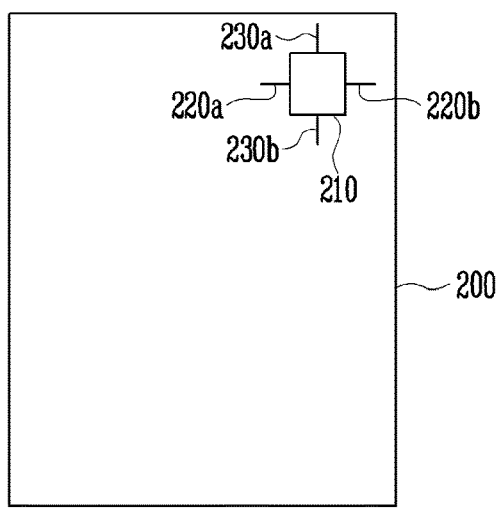
FIGS. 7A, 7B, 7C, and 7D are views illustrating an arrangement structure and a shape of a variable resistance element.

Referring to FIG. 7A, one variable resistance element 210 may be provided in the sensor 20 for sensing the transformation state of the display device 1 and the variable resistance element 210 may be positioned to be close to a corner of the substrate 200.

Figure 7B:
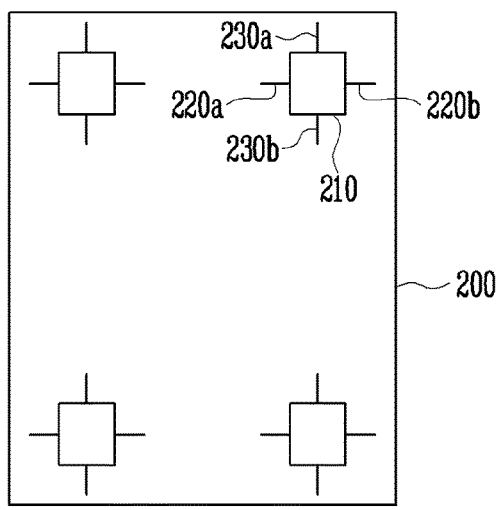

Referring to FIG. 7B, a plurality of variable resistance elements 210 may be provided in the sensor 20 for sensing the transformation state of the display device 1 and the variable resistance elements 210 may be respectively positioned to be close to corners of the substrate 200.

The embodiments are not limited thereto. The number of variable resistance elements 210 provided in the sensor 20 for sensing the transformation state of the display device 1 and an arrangement type of the variable resistance elements 210 may vary.

Figure 7C:
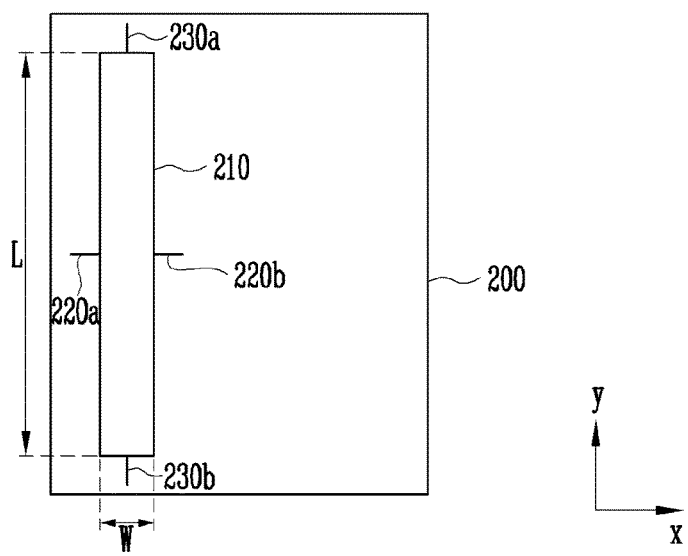

Referring to FIG. 7C, the variable resistance element 210 may be rectangular such that a width W in the first direction (the x axis direction) may be smaller than a length L in the second direction (the y axis direction).

In this case, the variable resistance element 210 may be positioned to be close to one side of the substrate 200.

Figure 7D:
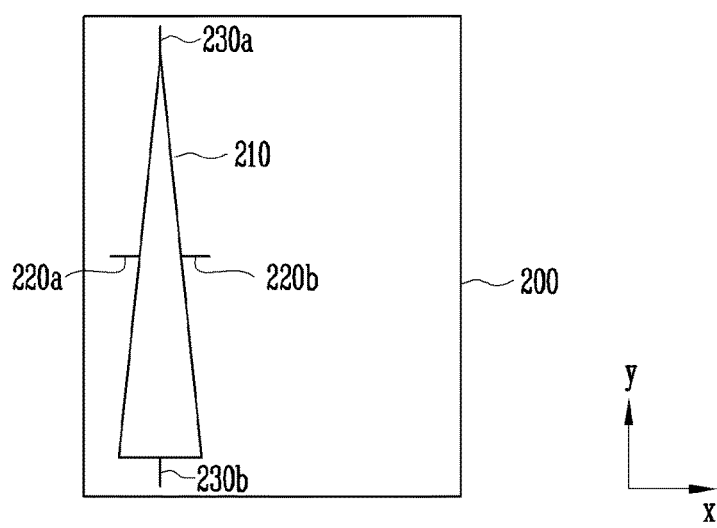

Referring to FIG. 7D, the variable resistance element 210 may be tapered. That is, the width W in the first direction (the x axis direction) may be smaller toward the second direction (the y axis direction).

In this case, the variable resistance element 210 may be positioned to be close to one side of the substrate 200.

On the other hand, the variable resistance element 210 is illustrated as being polygonal. However, the embodiments are not limited thereto. A shape of the variable resistance element 210 may vary.

Figure 8:
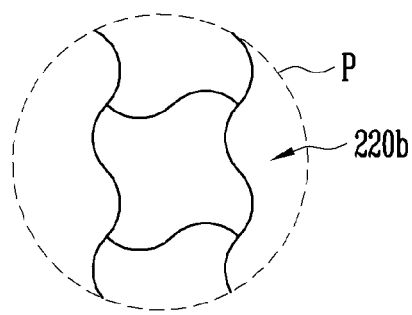
FIG. 8 is a view illustrating the region P of FIG. 3.

FIG. 8 is a view illustrating the region P of FIG. 3. In particular, FIG. 8 illustrates a part of the first sensing wiring line 220b.

Referring to FIG. 8, the first sensing wiring line 220b may have a mesh structure. In particular, a conductive line that forms the mesh structure may be a curved line.

When the substrate 200 is extended, the wiring lines 220a, 220b, 230a, and 230b connected to the variable resistance element 210 as well as the variable resistance element 210 may be also extended or contracted.

When the wiring lines 220a, 220b, 230a, and 230b have a mesh structure, since a shape (a cross-sectional area, an entire length, etc.) of the conductive line that forms the mesh structure is not transformed, it is possible to prevent resistances of the wiring lines 220a, 220b, 230a, and 230b from changing.

According to the embodiment, the first driving wiring line 220a, the second driving wiring line 230a, and the second sensing wiring line 230b as well as the first sensing wiring line 220b may have the structure of FIG. 8.

Figure 9A:
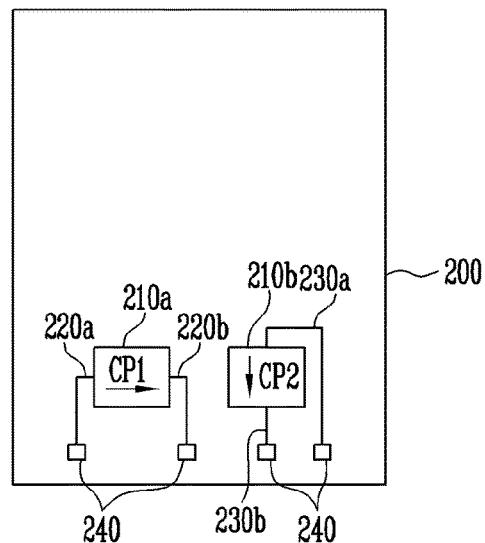
FIGS. 9A, 9B, and 9C are views illustrating a sensor according to another embodiment.
Figure 9B:
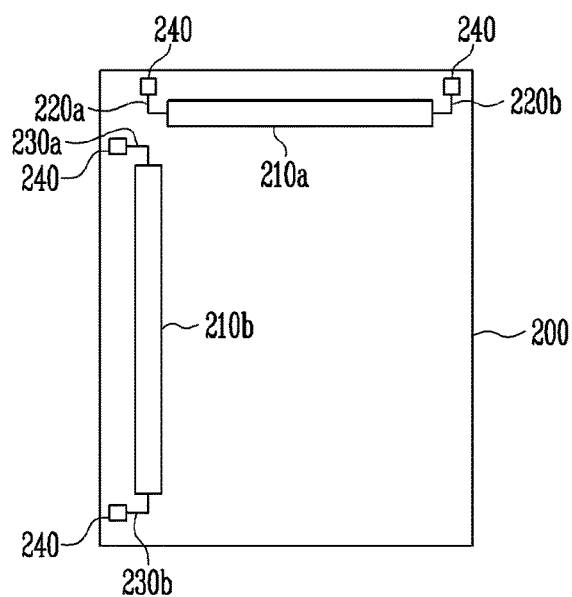
Figure 9C:
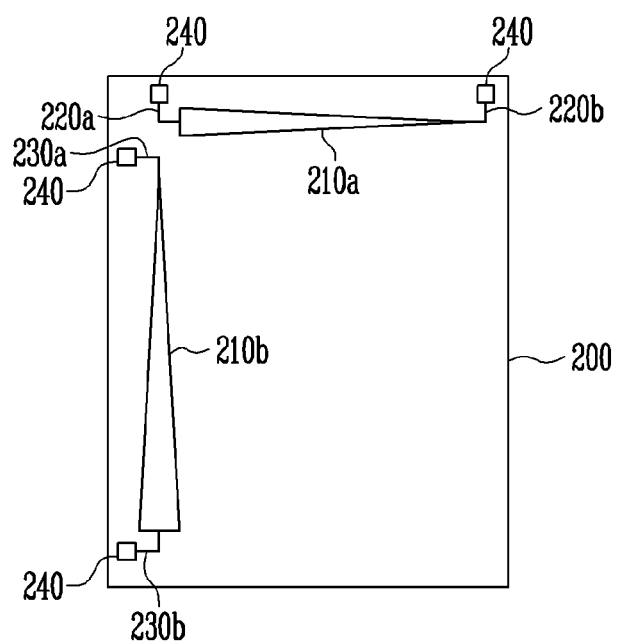

FIGS. 9A through 9C are views illustrating a sensor according to another embodiment.

Referring to FIG. 9A, the variable resistance element 210 may include a first sub-variable resistance element 210a and a second sub-variable resistance element 210b.

The first driving wiring line 220a and the first sensing wiring line 220b may be connected to the first sub-variable resistance element 210a. At this time, the first sub-variable resistance element 210a may be positioned between the first driving wiring line 220a and the first sensing wiring line 220b.

One end of the first driving wiring line 220a is connected to a pad 240 and the other end of the first driving wiring line 220a may be connected to the first sub-variable resistance element 210a. In addition, one end of the first sensing wiring line 220b is connected to the first sub-variable resistance element 210a and the other end of the first sensing wiring line 220b may be connected to a pad 240.

When the driving signal is applied to the first driving wiring line 220a, the first current path CP1 may be formed along the other end of the first driving wiring line 220a and one end of each of the first sub-variable resistance element 210a and the first sensing wiring line 220b.

At this time, the first current path CP1 may correspond to the first direction (the x axis direction).

The second driving wiring line 230a and the second sensing wiring line 230b may be connected to the second sub-variable resistance element 210b. At this time, the second sub-variable resistance element 210b may be positioned between the second driving wiring line 230a and the second sensing wiring line 230b.

One end of the second driving wiring line 230a is connected to a pad 240 and the other end of the second driving wiring line 230a may be connected to the second sub-variable resistance element 210b. In addition, one end of the second sensing wiring line 230b is connected to the second sub-variable resistance element 210b and the other end of the second sensing wiring line 230b may be connected to a pad 240.

When the driving signal is applied to the second driving wiring line 230a, the second current path CP2 may be formed along the other end of the second driving wiring line 230a and one end of each of the second sub-variable resistance element 210b and the second sensing wiring line 230b.

At this time, the second current path CP2 may correspond to the second direction (the y axis direction).

Referring to FIG. 9B, the first sub-variable resistance element 210a and the second sub-variable resistance element 210b may have the same shape as the variable resistance element 210 of FIG. 7C and may operate in the same way as the first sub-variable resistance element 210a and the second sub-variable resistance element 210b of FIG. 9A.

In addition, referring to FIG. 9C, the first sub-variable resistance element 210a and the second sub-variable resistance element 210b may have the same shape as the variable resistance element 210 of FIG. 7D and may operate in the same way as the first sub-variable resistance element 210a and the second sub-variable resistance element 210b of FIG. 9A.

When the sensor 20 is configured as illustrated in FIGS. 9A through 9C, the controller 250 may simultaneously supply the driving signal to the first driving wiring line 220a and the second driving wiring line 230a.

That is, the controller 250 may simultaneously obtain the sensing signals to which the first amount of change in resistance $\Delta R1$ corresponding to the first current path CP1 and the second amount of change in resistance $\Delta R2$ corresponding to the second current path CP2 are reflected.

Figure 10:
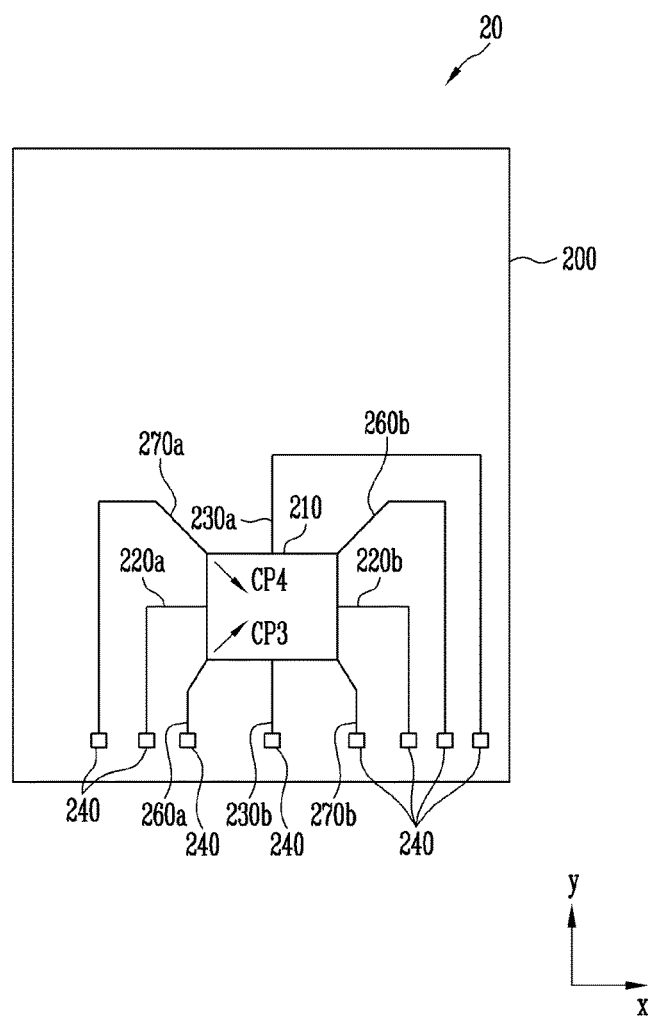
FIG. 10 is a view illustrating a sensor according to another embodiment.

FIG. 10 is a view illustrating a sensor 20 according to another embodiment.

Referring to FIG. 10, the sensor 20 according to the embodiment may include the substrate 200 and the variable resistance element 210 arranged on the substrate 200.

Since description of the variable resistance element 210 and the first driving wiring line 220a, the first sensing wiring line 220b, the second driving wiring line 230a, and the second sensing wiring line 230b connected to the variable resistance element 210 is to the same as the description given in the above-described embodiment, the description thereof will not be repeated.

A third driving wiring line 260a and a third sensing wiring line 260b may be connected to the variable resistance element 210. At this time, the variable resistance element 210 may be positioned between the third driving wiring line 260a and the third sensing wiring line 260b.

One end of the third driving wiring line 260a is connected to a pad 240 and the other end of the third driving wiring line 260a may be connected to the variable resistance element 210. In addition, one end of the third sensing wiring line 260b is connected to the variable resistance element 210 and the other end of the third sensing wiring line 260b may be connected to a pad 240.

The driving signal transmitted from the controller 250 is applied to the third driving wiring line 260a and a third current path CP3 may be formed along the other end of the third driving wiring line 260a and one end of each of the variable resistance element 210 and the third sensing wiring line 260b.

At this time, the third current path CP3 may correspond to a third direction and the third direction may be positioned between the x axis and the y axis, in particular, may form an angle of 45 degrees with the x axis or the y axis.

A fourth driving wiring line 270a and a fourth sensing wiring line 270b may be connected to the variable resistance element 210. At this time, the variable resistance element 210 may be positioned between the fourth driving wiring line 270a and the fourth sensing wiring line 270b.

One end of the fourth driving wiring line 270a is connected to a pad 240 and the other end of the fourth driving wiring line 270a may be connected to the variable resistance element 210. In addition, one end of the fourth sensing wiring line 270b is connected to the variable resistance element 210 and the other end of the fourth sensing wiring line 270b may be connected to a pad 240.

When the driving signal transmitted from the controller 250 is applied to the fourth driving wiring line 270a, a fourth current path CP4 may be formed along the other end of the fourth driving wiring line 270a and one end of each of the variable resistance element 210 and the fourth sensing wiring line 270b.

At this time, the fourth current path CP4 may correspond to a fourth direction and the fourth direction may be perpendicular to the third direction.

On the other hand, the controller 250 may not simultaneously apply the driving signal to the first through fourth driving wiring lines 220a, 230a, 260a, and 270a.

For example, the controller 250 may not apply the driving signal to the second through fourth driving wiring lines 230a, 260a, and 270a while applying the driving signal to the first driving wiring line 220a. At this time, the first amount of change in resistance $\Delta R1$ of the variable resistance element 210 may be reflected to the sensing signal obtained from the first sensing wiring line 220b and the first amount of change in resistance $\Delta R1$ may correspond to the first current path CP1.

In addition, the controller 250 may not apply the driving signal to the remaining driving wiring lines 220a, 260a, and 270a while applying the driving signal to the second driving wiring line 230a. At this time, the second amount of change in resistance ΔR2 of the variable resistance element 210 may be reflected to the sensing signal obtained from the second sensing wiring line 230b and the second amount of change in resistance ΔR2 may correspond to the second current path CP2.

In addition, the controller 250 may not apply the driving signal to the remaining driving wiring lines 220a, 230a, and 270a while applying the driving signal to the third driving wiring line 260a. At this time, a third amount of change in resistance ΔR3 of the variable resistance element 210 may be reflected to the sensing signal obtained from the third sensing wiring line 260b and the third amount of change in resistance ΔR3 may correspond to the third current path CP3.

In addition, the controller 250 may not apply the driving signal to the remaining driving wiring lines 220a, 230a, and 260a while applying the driving signal to the fourth driving wiring line 270a. At this time, the fourth amount of change in resistance ΔR4 of the variable resistance element 210 may be reflected to the sensing signal obtained from the fourth sensing wiring line 270b and the fourth amount of change in resistance ΔR4 may correspond to the fourth current path CP4.

That is, the controller 250 may sequentially obtain the changes in resistances of the variable resistance element 210 corresponding to the first through fourth directions.

The controller 250 may determine whether the display device 1 is in the first transformation state or the second transformation state by using the first through fourth amounts of changes in resistances. In particular, when the display device 1 is transformed in the third direction or the fourth direction, the controller 250 may more correctly determine the transformation state of the display device 1.

On the other hand, in FIGS. 3 through 10, it is illustrated that the sensor 20 is separate from the display panel 10 or the touch sensor 30 and the variable resistance element 210 is formed on the substrate 200. However, the embodiments are not limited thereto. For example, the sensor 20 may be integrated with the display panel 10 or may be formed on the substrate 110 included in the display panel 10 or on the encapsulation layer 130. The variable resistance element 210 may be positioned in the touch sensor 30 or may be directly positioned on the touch sensor 30 without the substrate 200.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the inventive concept as set forth in the following claims.

What is claimed is:

1. A display device comprising:
    a display panel;
    a variable resistance element positioned on the display panel;
    a first driving wiring line and a first sensing wiring line connected to the variable resistance element with the variable resistance element disposed between the first driving wiring line and the first sensing wiring line; and
    a second driving wiring line and a second sensing wiring line connected to the variable resistance element with the variable resistance element disposed between the second driving wiring line and the second sensing wiring line,
    wherein a first current path between the first driving wiring line and the first sensing wiring line in the variable resistance element is different from a second current path between the second driving wiring line and the second sensing wiring line in the variable resistance element.

2. The display device of claim 1, further comprising a controller configured to supply a driving signal to the first driving wiring line and the second driving wiring line and to determine whether the display device is in a first transformation state or a second transformation state different from the first transformation state with reference to sensing signals obtained from the first sensing wiring line and the second sensing wiring line.

3. The display device of claim 2,
    wherein the first current path corresponds to a first direction, and
    wherein the second current path corresponds to a second direction perpendicular to the first direction.

4. The display device of claim 3, wherein the controller is configured to obtain a sensing signal to which a first amount of change in resistance of the variable resistance element is reflected from the first sensing wiring line and obtain a sensing signal to which a second amount of change in resistance of the variable resistance element is reflected from the second sensing wiring line.

5. The display device of claim 2, wherein the display device is bent in the first transformation state and is stretched in the second transformation state.

6. The display device of claim 4, wherein the controller is configured to not supply the driving signal to the second driving wiring line while supplying the driving signal to the first driving wiring line.

7. The display device of claim 4,
    wherein the variable resistance element comprises a first sub-variable resistance element and a second sub-variable resistance element,
    wherein the first driving wiring line and the first sensing wiring line are connected to the first sub-variable resistance element, and
    wherein the second driving wiring line and the second sensing wiring line are connected to the second sub-variable resistance element.

8. The display device of claim 7, wherein the controller is configured to simultaneously supply the driving signal to the first driving wiring line and the second driving wiring line.

9. The display device of claim 4, further comprising:
    a third driving wiring line and a third sensing wiring line connected to the variable resistance element with the variable resistance element disposed between the third driving wiring line and the third sensing wiring line; and
    a fourth driving wiring line and a fourth sensing wiring line connected to the variable resistance element with the variable resistance element disposed between the fourth driving wiring line and the fourth sensing wiring line.

10. The display device of claim 9, wherein a third current path between the third driving wiring line and the third sensing wiring line in the variable resistance element is different from a fourth current path between the fourth driving wiring line and the fourth sensing wiring line in the variable resistance element.

11. The display device of claim 10, wherein the first, second, third, and fourth current paths are different from one another.

12. The display device of claim 11,
wherein the controller is configured to supply the driving signal to the third driving wiring line and the fourth driving wiring line, and
wherein, while the driving signal is applied to one of the first, second, third, and fourth wiring lines, the driving signal is not applied to remaining wiring lines.

13. The display device of claim 1, wherein the variable resistance element has a shape in which a length is larger than a width.

14. The display device of claim 1, wherein the variable resistance element has a tapered shape.

15. The display device of claim 1, wherein the first driving wiring line, the second driving wiring line, the first sensing wiring line, and the second sensing wiring line have mesh structures.

16. A sensor comprising:
a variable resistance element;
a pair of first wiring lines connected to the variable resistance element with the variable resistance element disposed between the pair of first wiring lines; and
a pair of second wiring lines connected to the variable resistance element with the variable resistance element disposed between the pair of second wiring lines,
wherein a first current path between the pair of first wiring lines in the variable resistance element is different from a second current path between the pair of second wiring lines in the variable resistance element.

17. The sensor of claim 16,
wherein the first current path corresponds to a first direction, and
wherein the second current path corresponds to a second direction perpendicular to the first direction.

18. The sensor of claim 17, wherein a driving signal is configured to be alternately applied to the first current path and the second current path.

19. The sensor of claim 17,
wherein the variable resistance element comprises a first sub-variable resistance element and a second sub-variable resistance element, and
wherein the pair of first wiring lines are connected to the first sub-variable resistance element and the pair of second wiring lines are connected to the second sub-variable resistance element.

20. The sensor of claim 19, wherein a driving signal is configured to be simultaneously applied to the first current path and the second current path.

* * * * *